United States Patent
Tsybakov et al.

(10) Patent No.: US 7,881,327 B2
(45) Date of Patent: Feb. 1, 2011

(54) CODE CHANNEL MANAGEMENT IN A WIRELESS COMMUNICATIONS SYSTEM

(75) Inventors: Boris Tsybakov, San Diego, CA (US); Edward Tiedemann, Jr., Concord, MA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 11/875,634

(22) Filed: Oct. 19, 2007

(65) Prior Publication Data

US 2009/0103427 A1 Apr. 23, 2009

Related U.S. Application Data

(62) Division of application No. 10/602,359, filed on Jun. 23, 2003.

(51) Int. Cl.
*H04B 7/216* (2006.01)
(52) U.S. Cl. .................... 370/441; 370/329
(58) Field of Classification Search ........... 370/203, 370/206, 208, 209, 320, 329, 441
See application file for complete search history.

(56) References Cited

U.S. PATENT DOCUMENTS

| | | | |
|---|---|---|---|
| 32,905 A | 7/1861 | Baran | |
| 4,330,857 A | 5/1982 | Alvarez, III et al. | |
| 4,392,220 A | 7/1983 | Hirosaki et al. | |
| 5,299,190 A | * 3/1994 | LaMaire et al. | 370/413 |
| 5,442,625 A | 8/1995 | Gitlin et al. | |
| 5,504,773 A | 4/1996 | Padovani et al. | |
| 5,522,013 A | 5/1996 | Vanska | |
| 5,533,013 A | 7/1996 | Leppanen | |
| 5,703,902 A | 12/1997 | Ziv et al. | |

(Continued)

FOREIGN PATENT DOCUMENTS

EP 1061680 6/1999

(Continued)

OTHER PUBLICATIONS

3GPP TS 25.211 V3.7.0 (Jun. 2001). 3rd Generation Partnership Project Technical Specification Group Radio Access Network Physical Channels and Mapping of Transport Channels onto Physical Channels (FDD), pp. 1-45, XP0002902457.

(Continued)

*Primary Examiner*—Huy D Vu
*Assistant Examiner*—Adnan Baig
(74) *Attorney, Agent, or Firm*—Rupit M. Patel

(57) ABSTRACT

Systems and techniques are disclosed relating to communications. The systems and techniques involve dividing a plurality of subscriber stations into a plurality of groups, assigning a different plurality of orthogonal codes to each of the groups, the number of the orthogonal codes assigned to one of the groups being less than the number of subscriber stations in said one of the groups, encoding communications to one of the subscriber stations in said one of the groups at a data rate, and determining whether to spread at least a portion of communications to said to one of the subscriber stations with one of the orthogonal codes assigned to said one of the groups as a function of the data rate.

11 Claims, 5 Drawing Sheets

U.S. PATENT DOCUMENTS

| | | | |
|---|---|---|---|
| 5,751,725 A | 5/1998 | Chen | |
| 5,781,583 A | 7/1998 | Bruckert et al. | |
| 5,799,010 A | 8/1998 | Lomp et al. | |
| 5,859,840 A | 1/1999 | Tiedemann, Jr. et al. | |
| 5,946,633 A | 8/1999 | McAlinden | |
| 5,991,279 A | 11/1999 | Haugli et al. | |
| 6,005,851 A | 12/1999 | Craddock et al. | |
| 6,005,855 A | 12/1999 | Zehavi et al. | |
| 6,108,550 A | 8/2000 | Wiorek et al. | |
| 6,173,005 B1 | 1/2001 | Kotzin et al. | |
| 6,201,798 B1 | 3/2001 | Campanella et al. | |
| 6,272,124 B1 | 8/2001 | Ahn et al. | |
| 6,289,228 B1 | 9/2001 | Rotstein et al. | |
| 6,317,413 B1 * | 11/2001 | Honkasalo | 370/209 |
| 6,335,922 B1 | 1/2002 | Tiedemann, Jr. | |
| 6,377,809 B1 | 4/2002 | Rezaiifar et al. | |
| 6,469,993 B1 | 10/2002 | Seo et al. | |
| 6,473,619 B1 | 10/2002 | Kong et al. | |
| 6,477,157 B1 | 11/2002 | Kim et al. | |
| 6,519,260 B1 | 2/2003 | Galyas et al. | |
| 6,542,481 B2 | 4/2003 | Foore et al. | |
| 6,552,996 B2 | 4/2003 | Kim et al. | |
| 6,675,016 B2 | 1/2004 | Lucidarme et al. | |
| 6,700,881 B1 | 3/2004 | Kong et al. | |
| 6,707,804 B2 | 3/2004 | Proctor, Jr. | |
| 6,768,728 B1 | 7/2004 | Kim et al. | |
| 6,804,521 B2 | 10/2004 | Tong et al. | |
| 6,834,047 B1 | 12/2004 | Yoon et al. | |
| 6,850,514 B1 | 2/2005 | Dick et al. | |
| 6,870,824 B1 | 3/2005 | Kim et al. | |
| 6,901,062 B2 | 5/2005 | Scherzer et al. | |
| 6,917,581 B2 | 7/2005 | Proctor et al. | |
| 6,930,981 B2 | 8/2005 | Gopalakrishnan et al. | |
| 6,963,540 B2 | 11/2005 | Choi et al. | |
| 6,975,666 B2 | 12/2005 | Affes et al. | |
| 6,996,056 B2 | 2/2006 | Chheda et al. | |
| 6,996,069 B2 | 2/2006 | Willenegger | |
| 6,996,075 B2 | 2/2006 | Santhoff et al. | |
| 7,031,741 B2 | 4/2006 | Lee et al. | |
| 7,058,038 B2 | 6/2006 | Yi et al. | |
| 7,130,284 B2 | 10/2006 | Lee et al. | |
| 7,167,460 B2 | 1/2007 | Zehavi et al. | |
| 7,218,617 B1 | 5/2007 | Usuda et al. | |
| 7,254,397 B2 | 8/2007 | Tiedemann, Jr. et al. | |
| 7,319,690 B2 | 1/2008 | Wu et al. | |
| 7,349,375 B2 | 3/2008 | Gerakoulis | |
| 7,352,796 B1 | 4/2008 | Von Der Embse | |
| 7,356,022 B2 | 4/2008 | Takano et al. | |
| 7,599,440 B2 | 10/2009 | Won et al. | |
| 2001/0006515 A1 | 7/2001 | Lee et al. | |
| 2001/0012301 A1 | 8/2001 | Yi et al. | |
| 2001/0021169 A1 | 9/2001 | Kim | |
| 2001/0024482 A1 | 9/2001 | Tiedemann, Jr. et al. | |
| 2001/0053140 A1 | 12/2001 | Choi et al. | |
| 2002/0021692 A1 | 2/2002 | Huh et al. | |
| 2002/0067692 A1 | 6/2002 | Yun et al. | |
| 2002/0097697 A1 | 7/2002 | Bae et al. | |
| 2002/0110101 A1 | 8/2002 | Gopalakrishnan et al. | |
| 2002/0122398 A1 | 9/2002 | Jou | |
| 2002/0141367 A1 | 10/2002 | Hwang et al. | |
| 2002/0160781 A1 | 10/2002 | Bark et al. | |
| 2002/0196867 A1 | 12/2002 | Yoon | |
| 2003/0063583 A1 | 4/2003 | Padovani et al. | |
| 2003/0067964 A1 | 4/2003 | Li | |
| 2003/0078010 A1 | 4/2003 | Davis | |
| 2003/0114162 A1 | 6/2003 | Chheda et al. | |
| 2003/0161286 A1 | 8/2003 | Li | |
| 2005/0050427 A1 | 3/2005 | Jeong et al. | |
| 2005/0084112 A1 | 4/2005 | Kim et al. | |
| 2005/0164663 A1 | 7/2005 | Santhoff et al. | |
| 2005/0250521 A1 | 11/2005 | Joshi et al. | |
| 2006/0120322 A1 | 6/2006 | Lindskog et al. | |
| 2006/0209674 A1 | 9/2006 | Chen et al. | |

FOREIGN PATENT DOCUMENTS

| | | |
|---|---|---|
| EP | 1035676 | 9/2000 |
| EP | 1035677 A1 | 9/2000 |
| JP | 11502690 T | 3/1999 |
| JP | 2001517049 T | 10/2001 |
| WO | WO9746044 A1 | 12/1997 |
| WO | WO0033589 A1 | 6/2000 |
| WO | 0042723 | 7/2000 |
| WO | WO0054443 A1 | 9/2000 |
| WO | WO01355550 A1 | 5/2001 |
| WO | WO0169952 A1 | 9/2001 |
| WO | WO02035735 A2 | 5/2002 |

OTHER PUBLICATIONS

Baier, "Open multi-rate radio interface architectural based on CDMA" Oct. 12, 1993, Universal Personal Communications, 1993. Personal Communications: Gateway to the 21st Century. Conference Record., 2nd International Conference on Ottawa, Ont., Canada Oct. 12-15, 1993, New York, NY USA, IEEE, pp. 985, XP010198264 ISBN: 0-7803-1396-8.

Fossa C.E et al., "A Dynamic Code Assignment Algorithm for Quality of Service in 3G Wireless Networks" Wireless Communications and Networking Conference, 2002. WCN2002. 2002 IEEE, Piscataway, NJ, USA IEEE, Mar. 17, 2002, vol. 1, sages 1-6, XP010585724.

Oguz Sunay M. et al., "Provision of Variable Data Rates in Third Generation Wideband DS CDMA Systems" Wireless Communications and Networking Conference, 1999. WCNC. 1999 IEEE New Orleans, LA, USA Sep. 21-24, US, pp. 505-509, XP010353838.

International Search Report - PCT/US04/018993 - International Search Authority, European Patent Office - Sep. 11, 2004.

Written Opinion - PCT/US04/018993 - International Search Authority, European Patent Office - May 11, 2004.

Internet Protocol, DARPA Internet Protocol Specification, Sep. 1981.

* cited by examiner

CODE CHANNEL MANAGEMENT IN A WIRELESS COMMUNICATIONS SYSTEM

RELATED APPLICATION

The present application is a divisional of pending U.S. patent application Ser. No. 10/602,359 filed on Jun. 23, 2003 and titled "Code Channel Management in a Wireless Communications System".

BACKGROUND

1. Field

The present invention relates generally to communications, and more specifically, to systems and techniques for managing code channel assignments in a wireless communications system.

2. Background

Modern communications systems are designed to allow multiple users to share a common communications medium. One such communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the signal over the entire spectrum. The transmitted signals can be separated in the receiver by a correlator using a corresponding code to de-spread the desired signal. The undesired signals, whose codes do not match, contribute only to noise.

In spread-spectrum communications, fixed base stations are generally dispersed throughout an access network to support wireless communications with various user devices. The access network may be divided into regions known as cells with a base station serving each cell. In high traffic applications, the cell may be further divided into sectors with a base station serving each sector. In this configuration, the base station may assign one or more dedicated channels using Walsh codes to each user within its cellular region to support voice and data communications over a forward link transmission. A forward link transmission refers to a transmission from the base station to a user and a reverse link transmission refers to a transmission from a user to the base station. One or more shared channels may also be used by the base stations with its own distinct Walsh code. Additional Walsh code assignments may be reserved for various signaling and system support functions.

There is a limited number of Walsh codes available to any given base station, and thus the number of channels, including dedicated and shared channels, is limited for a given code space. In CDMA systems of the past, the forward link capacity was limited by the mutual interference between multiple users, and therefore, the code space was sufficient for the number of supportable channels. However, recent advances in technology has reduced the effects of interference, allowing for additional simultaneous users, and thus increasing demand for more codes to support additional channels.

Moreover, with the tremendous increase in wireless communications over the past years, there has been an ever-increasing demand for higher data rate services to support web browsing, video applications, and the like. Often this demand is met by using multiple dedicated channels to carry data from the base station to the user with each channel having a distinct Walsh code. In some instances, high data rate services may be supported by variable Walsh spreading. Variable Walsh spreading entails using shorter length Walsh codes for higher data rate transmissions. Using a shorter length Walsh code, however, precludes using all longer codes that contain the chip pattern of the shorter code, thereby depleting multiple Walsh codes.

Increased demand for codes, reduced available codes, or a combination of the two could result in an insufficient number of Walsh codes to channelize the forward link. Thus, the capacity of the system may be limited in situations where, due to advances in interference mitigation, additional users and/or increased data throughput might otherwise be available. Accordingly, there is a need in the art for an efficient methodology for managing code allocations.

SUMMARY

In one aspect of the present invention, a method of communications includes dividing a plurality of subscriber stations into a plurality of groups, assigning a different plurality of orthogonal codes to each of the groups, the number of the orthogonal codes assigned to one of the groups being less than the number of subscriber stations in said one of the groups, encoding communications to one of the subscriber stations in said one of the groups at a data rate, and determining whether to spread at least a portion of communications to said to one of the subscriber stations with one of the orthogonal codes assigned to said one of the groups as a function of the data rate.

In another aspect of the present invention, a communications station includes a processor configured to divide a plurality of subscriber stations into a plurality of groups, and assign a different plurality of orthogonal codes to each of the groups, the number of the orthogonal codes assigned to one of the groups being less than the number of subscriber stations in said one of the groups, and an encoder configured to encode communications to one of the subscriber stations in said one of the groups at a data rate, wherein the processor is further configured to determine whether to spread at least a portion of the communications to said one of the subscriber stations with one of the orthogonal codes assigned to said one of the groups as a function of the data rate.

In yet another aspect of the present invention, a communications station includes means for dividing a plurality of subscriber stations into a plurality of groups, means for assigning a different plurality of orthogonal codes to each of the groups, the number of the orthogonal codes assigned to one of the groups being less than the number of subscriber stations in said one of the groups, means for encoding communications to one of the subscriber stations in said one of the groups at a data rate, and means for determining whether to spread at least a portion of the communications to said one of the subscriber stations with one of the orthogonal codes assigned to said one of the groups as a function of the data rate.

In a further aspect of the present invention, a communications station includes means for storing an assignment matrix having n rows, k columns, l number of ones in each of the rows, and k-l number of zeros in each of the rows, where n=a number of subscriber stations assigned to a group, k equals a number of orthogonal codes assigned to the group, and l=a number of the orthogonal codes allocated to each of the n subscriber stations from the k number of orthogonal codes assigned to the group; means for constructing a second matrix having k rows selected from the assignment matrix; each of the k rows corresponding to one of k subscriber stations selected from the n subscriber stations; means for permuting the rows of the second matrix such that a diagonal extending from the first column to the kth column comprises all ones; and means for assigning one of the k orthogonal codes to each of the k subscriber stations as a function of the permuted second matrix.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following description, various systems and techniques will be described in the context of a CDMA communications system using Walsh codes to channelize the forward link. While these techniques may be well suited for use in this type of application, those skilled in the art will readily appreciate that these systems and techniques may be applied to any spread-spectrum communications environment. Accordingly, any reference to a Walsh code management methodology in a CDMA communications system is intended only to illustrate various inventive aspects of the present invention, with the understanding that these inventive aspects have a wide range of applications.

Figure 1:
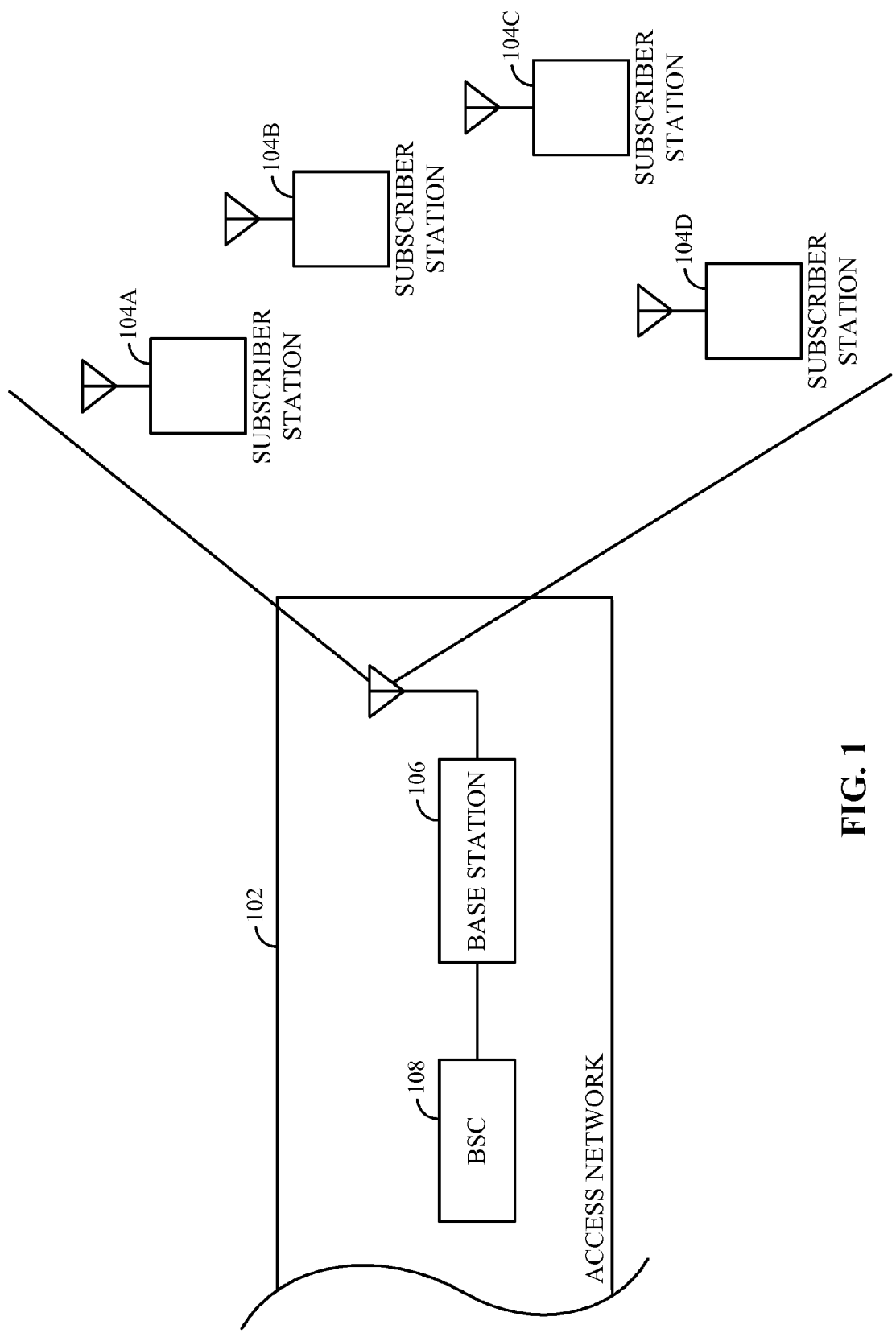
FIG. 1 is a conceptual block diagram of an embodiment of CDMA communications system.

FIG. 1 is a conceptual block diagram of an embodiment of a CDMA communications system. An access network 102 may be used to support wireless communications with multiple user devices 104a-d. The access network 102 may also be connected to additional networks outside the access network, such as the Internet, a corporate intranet, a public switched telephone network (PSTN), or the like. The user device 104, commonly referred to as a subscriber station, may be any type of device that may communicate with the access network 102 including a mobile telephone, a computer, a modem, a personal digital assistant, or any other similar device.

The access network 102 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one base station 106 is shown serving an entire cell. A base station controller (BSC) 108 may be used to coordinate the activities of multiple base stations, as well as provide an interface to the networks outside the access network 102.

In CDMA communication systems, Walsh codes are commonly used to separate multiple subscriber stations in communication with a base station. Each subscriber station may be assigned a distinct Walsh code during call set-up to support forward link communications over a dedicated traffic channel. The Walsh code may be any length depending on the particular application and overall design constraints. A short Walsh code reduces processing time whereas a long Walsh code increases code gain. The length of the Walsh code also has an impact on system capacity. There are only as many Walsh codes as the code length. Thus, if a Walsh code length of 64 is used, which is very common in today's CDMA communication systems, then there are only 64 Walsh codes available. This limits the number of available channels in the forward link.

Traditionally, the Walsh code length has been selected to accommodate the data rate of the forward link communications. In variable data rate systems, the Walsh code length has generally been selected to accommodate the maximum data rate. This approach may result in Walsh code resources being underutilized for lower data rates. An efficient methodology for Walsh code assignments in variable data rate systems may be used to reduce or eliminate the potential for underutilization of the Walsh code space during periods of low data rates. A CDMA communications system using a variable rate vocoder is just one example of a system that could benefit from the various systems and techniques disclosed throughout this disclosure to efficiently manage Walsh code assignments.

A variable rate vocoder is typically used to reduce mutual interference among multiple users operating in the same cellular region by transmitting voice with the least amount of data to sustain acceptable voice quality. An Enhanced Variable Rate Codec (EVRC) is a common example. An EVRC transmits voice using eighth, quarter, half, and full rate frames. During periods of silence, eighth rate frames may be transmitted. The power required to transmit eighth rate frames, and thus the interference introduced into the cellular region, is lower than when higher rate frames are transmitted. During periods of active speech, a variety of higher rate frames may be transmitted. As it turns out, on the average, eighth rate and full rate frames are used predominantly, and quarter and half rate frames are used less frequently.

A Selectable Mode Vocoder (SMV) is another example of a vocoder. The SMV makes more efficient use of the medium rate frames (i.e., quarter and half rates), thus reducing the frequency of the full rate frames. The result is that the average rate of a SMV may be less than the average rate of an EVRC. From an interference standpoint, the capacity may be improved.

As more efficient vocoders become standard technology, greater improvements may be realized in system capacity through reduced power usage by lowering the average voice rate. Yet, with today's technology, these vocoders use up the same amount of resources in terms of Walsh code space because their required peak rate remains unchanged. To more efficiently utilize the Walsh code space, various systems and techniques will be described to manage Walsh code assignments in a manner that takes into consideration the data rate of the forward link communications. Although these systems and techniques will be described in the context of a variable rate vocoder, those skilled in the art will be readily able to apply these principles to any variable rate data scheme. Moreover, these systems and techniques are not limited to managing Walsh code assignments in the forward link, but may be applied to any type of code assignments in either the forward or reverse link.

Figure 2:
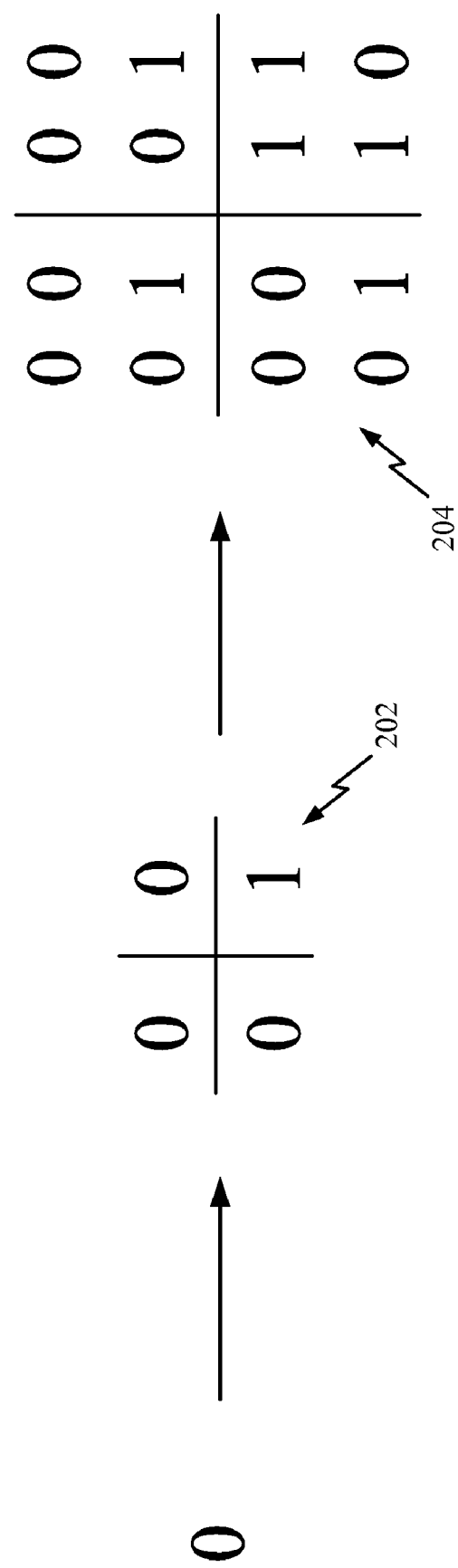
FIG. 2 is a conceptual diagram illustrating the creation of orthogonal codes.

Before describing various systems and techniques for managing Walsh code assignments, it is useful to briefly discuss some fundamental principles of Walsh codes. Walsh codes are orthogonal codes. This means that Walsh codes have zero cross-correlation. Zero cross-correlation is obtained if the product of the two codes, summed over the length of the codes, is zero. Referring to FIG. 2, Walsh codes may be easily generated by starting with a seed "0", repeating the "0" horizontally and vertically, and the complimenting the "0" diagonally, to generate two Walsh codes 202 having a length of two. This is often referred to as a 2×2 Walsh code. A 4×4 Walsh code 204 may then be generated by repeating the 2×2 Walsh code 202 horizontally and vertically, and complimenting the 2×2 Walsh code 202 diagonally. This process may be repeated until a Walsh code having the desired length is derived. In the case of many conventional CDMA communication systems, that would be a 64×64 Walsh code.

In variable rate vocoder applications, the Walsh code length may be selected to support a full rate frame. The frame rate is a measure of the volume of information being transmitted, typically measured in bits per second. Depending on the encoding and modulation scheme, one or more symbols may be generated for each voice bit. The volume of symbols being transmitted is commonly referred to as the symbol rate, and corresponds to the frame rate. Lower symbol rates may use longer Walsh codes to maintain a constant chip rate. Accordingly, a ½ rate voice frame may be spread with a Walsh code that is twice as long as the Walsh code for a full rate voice frame. By way of example, if a full rate voice frame is spread with a Walsh code having a length of 64, than a ½ rate voice frame may be spread with a Walsh code having a length of 128. Similarly, a ¼ rate voice frame may be spread with a Walsh code having a length of 256, and a ⅛ rate voice frame may be spread with a Walsh code having a length of 512.

Figure 3:
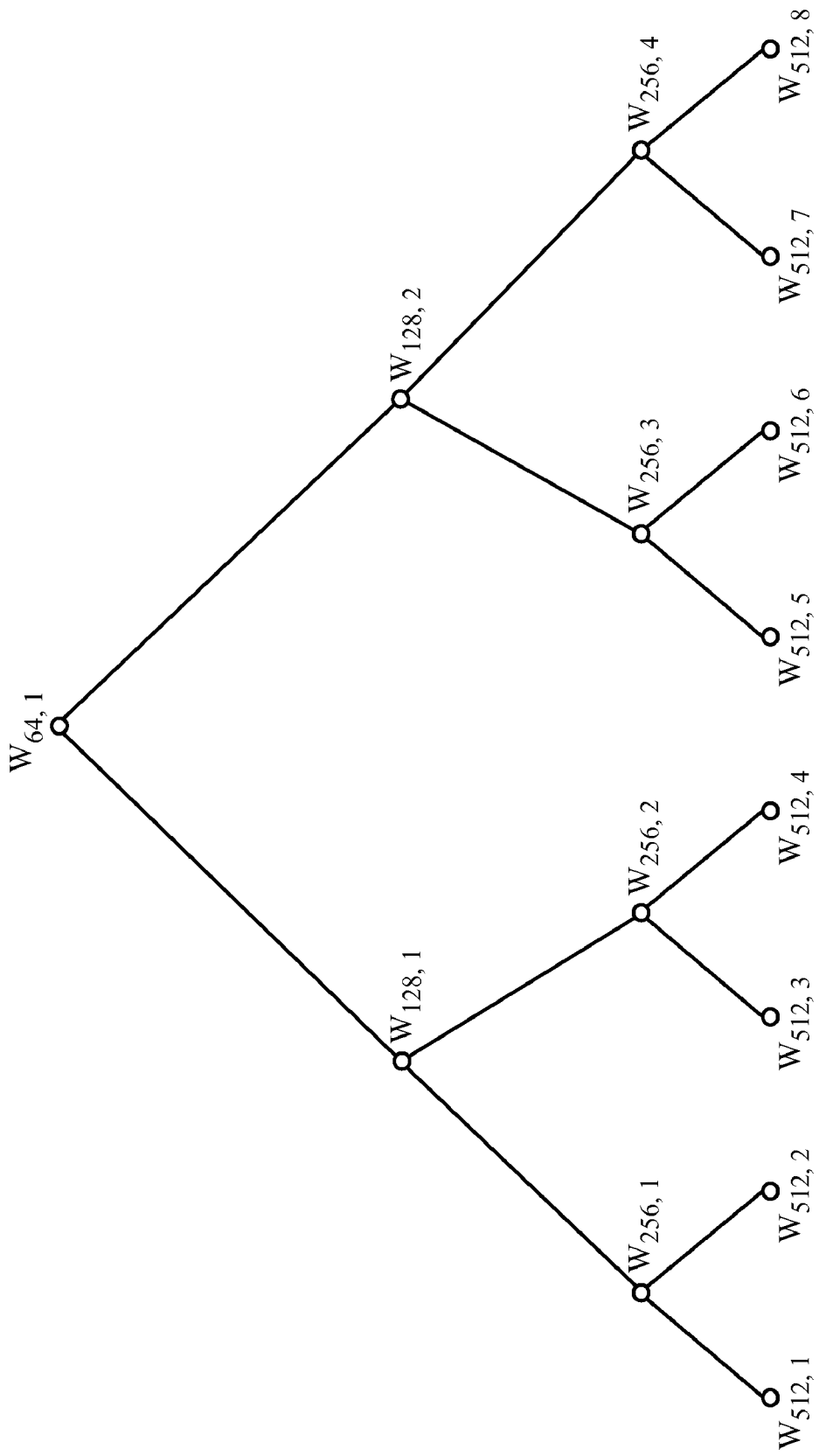
FIG. 3 is a conceptual diagram illustrating a hierarchical tree structure used to model a Walsh code having a length of 64.

The tree structure for recursively constructing Walsh codes of successfully longer lengths may be exploited to efficiently assign Walsh codes to communications in a variable rate vocoder environment. This concept is best understood with reference to FIG. 3. FIG. 3 is a hierarchical tree structure used to model a Walsh code having a length of 64 for spreading a full rate voice frame. A Walsh code $W_{L,index}$, is located at a node in the tree structure identified by the length, and an index identifying one of the Walsh codes of a particular length. Any particular Walsh code is orthogonal to all other Walsh codes in the tree structure, except for those of greater length branching from the Walsh code. Thus, for example, four Walsh codes $W_{256,1}$-$W_{256,4}$ with a length of 256 may be assigned. This means that a single Walsh code may be used to support four ¼ rate voice frames. Alternatively, if a Walsh code having a length of 128 is assigned, $W_{128,1}$ for example, then only two Walsh codes with a length of 256 remain available: $W_{256,3}$ and $W_{256,4}$. The Walsh codes branching from the assigned code $W_{128,1}$ with longer lengths are not orthogonal to the assigned Walsh code $W_{128,1}$, and therefore, may not be used to spread other channels. The unavailable Walsh codes include $W_{256,1}$, $W_{512,1}$, $W_{512,2}$, $W_{256,2}$, $W_{512,3}$, and $W_{512,4}$. Thus, in this second example with the Walsh code $W_{128,1}$ being assigned, the remaining possible Walsh code assignments include a number of possibilities, which are given in Table 1 below.

TABLE 1

| Case | Available Walsh Code Assignments |
|---|---|
| 1 | $W_{128,2}$ |
| 2 | $W_{256,3}$; $W_{256,4}$ |
| 3 | $W_{256,3}$; $W_{512,7}$; $W_{512,8}$ |
| 4 | $W_{256,4}$; $W_{512,5}$; $W_{512,6}$ |
| 5 | $W_{512,5}$; $W_{512,6}$; $W_{512,7}$; $W_{512,8}$ |

The use of longer Walsh codes to support lower rate voice frames may be implemented in any number of ways. One approach involves dividing the Walsh code space into dedicated channels and supplemental channels. A Walsh code may be assigned to each subscriber station during call set-up to support a dedicated forward link traffic channel. The Walsh code may have a length suitable to support a ½ rate voice frame. By way of example, if a 64×64 Walsh code is used to support full rate frames, each dedicated forward link traffic channel may use a Walsh code having a length of 128. With this approach, the number of Walsh codes consumed by the dedicated forward link traffic channels is equal to ½ the number of subscriber stations communicating with the base station. The dedicated forward link traffic channel may be used to support forward link communications at ½, ¼, and ⅛ frame rates.

The supplemental channels may be used to support overflow from the dedicated forward link traffic channel when the voice frame is transmitted at full rate. Since each subscriber station has a dedicated forward link traffic channel supported by a Walsh code having a length of 128, a supplemental channel supported by a Walsh code of the same length may be used to support a full rate frame transmission. In other words, the subscriber station may use its dedicated forward link traffic channel to transmit half the data in a ½ rate frame, and use a supplemental forward link traffic channel to transmit the remaining half of the data in a ½ rate frame, resulting in an effective full rate frame.

Dedicated forward link traffic channels supported by Walsh codes having a length of 128 may underutilize the Walsh code resources for communications at ¼ and ⅛ frame rates. Accordingly, the dedicated forward link traffic channels may be supported by Walsh codes having a length of 256 or 512. This may result in a more efficient use of the Walsh code space, but adds additional complexity to the task of managing the supplemental forward link traffic channels. The actual length of the Walsh codes used to support the dedicated forward link traffic channels will likely be based on performance tradeoff between these competing factors, and likely vary depending on the system application and the overall design constraints. It is conceivable that for some system applications, the length of the Walsh code used to support the dedicated forward link traffic channels may vary. By way of example, the base station may assign a dedicated forward link traffic channel to one subscriber station with a Walsh code having a length of 128, and assign a dedicated forward link traffic channel to another subscriber station with a Walsh code having a length of 512. The manner in which the dedicated forward link traffic channels are constructed are well within the capabilities of one skilled in the art.

Figure 4:
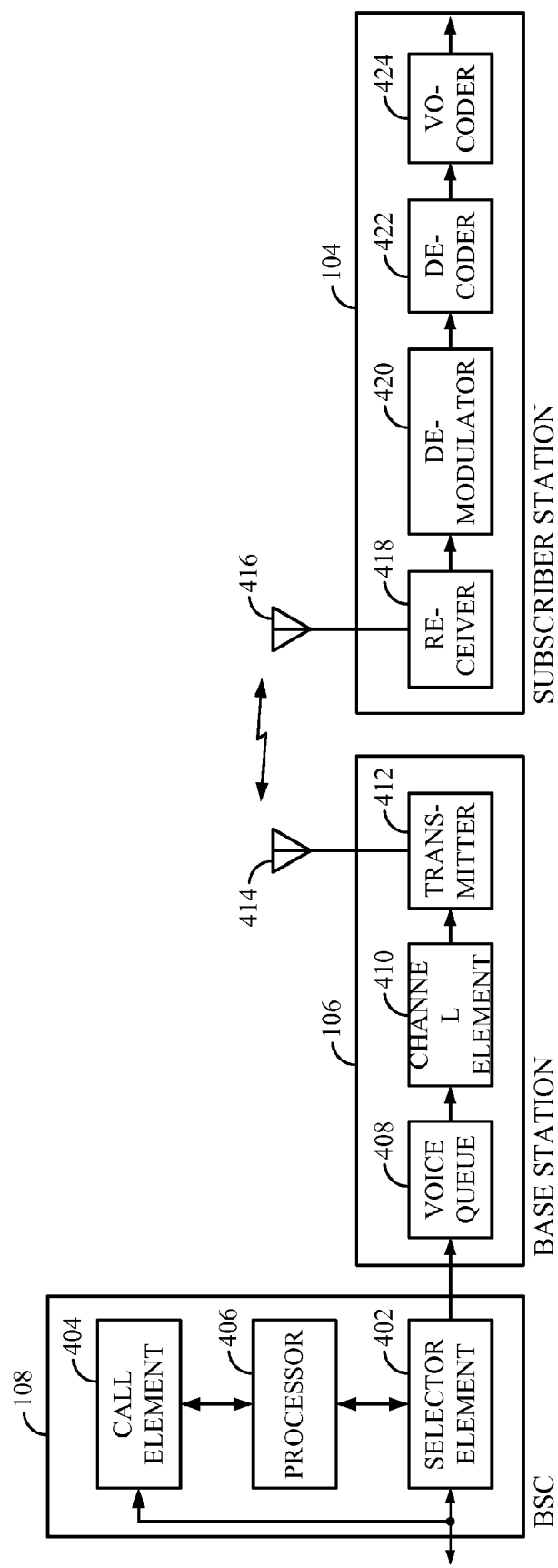
FIG. 4 is a simplified functional block diagram illustrating an embodiment of various subsystems for a CDMA communications system.

FIG. 4 is a simplified functional block diagram of a subscriber station in communication with the base station under control of the BSC. The BSC 108 includes many selector elements, although only one selector element 402 is shown for simplicity. One selector element is dedicated to communications with each subscriber station through one or more base stations. When a call is initiated, a call element 404 may be used to establish a connection between the selector element 402 and the subscriber station 104. A processor 406 may be used to assign to the subscriber station 104 a Walsh code to support a dedicated forward link traffic channel. The processor 406 may also be used to allocate multiple Walsh codes to the subscriber station 104 to support a supplemental forward link traffic channel. By allocating multiple Walsh codes to the subscriber station 104, the processor 406 may maintain a certain degree of flexibility to dynamically change the Walsh code assignment on the supplemental forward link traffic channel, on a frame-by-frame basis, to achieve the most efficient use of the code space across the base station's cellular region. The Walsh code for the dedicated forward link traffic channel and the allocated Walsh codes for the supplemental forward link traffic channel may be transmitted from the processor 406 to the subscriber station 104 with the exchange of signaling messages during call set-up.

The selector 402 may be configured to receive voice communications in a pulse code modulation (PCM) format from the access network. The selector element 402 may include a variable rate vocoder (not shown) configured to convert the PCM voice into voice frames using any known voice compression algorithm. The vocoder may be configured to communicate the frame rate selected for each voice frame to the processor 406. For each full rate frame transmission initiated by the vocoder, the processor assigns one Walsh code from the multiple Walsh codes previously allocated to the subscriber station 104 to handle the overflow from the dedicated forward link traffic channel. This newly assigned Walsh code may then be signaled to the base station 106.

The base station 106 may include a voice queue 408 which buffers the voice frames from the selector element 402 before transmission to the subscriber station 104. The voice frame from the queue 406 may be provided to a channel element 410. The channel element 410 may provide various signal processing functions such as convolutional encoding including cyclic redundancy check (CRC) functions, interleaving, scrambling with a long pseudo-random noise (PN) code, and modulation using QPSK, 8-PSK, 16-QAM, or any other modulation scheme known in the art.

The manner in which the modulated voice frames are handled in the channel element 410 depends on the frame rate. If the voice frame is less than full rate, then the modulated voice frame may be spread with the assigned Walsh code for the dedicated forward link traffic channel. If, one the other hand, the voice frame is at the full rate, then the voice frame may be separated into two data streams. The first data stream may be spread with the assigned Walsh code for the dedicated forward link traffic channel, and the second data stream may be spread with the assigned Walsh code for the supplemental forward link traffic channel. Either way, the channelized forward link voice frames may be combined with other Walsh code overhead channels, and quadrature modulated with short PN codes. The output of the channel element 410 may be provided to a transmitter 412 for filtering, amplification and upconversion to a carrier frequency before transmission over the forward link from the base station 106 to the subscriber station 104 via an antenna 414.

The forward link transmission may be received by an antenna 416 at the subscriber station 104 and coupled to a receiver 418 for filtering, amplification, and downconvertion to a baseband signal. The baseband signal may be coupled to a demodulator 420 which provides various demodulation functions including quadrature demodulation using the short PN codes, despreading to recover the voice frames, and demodulation using the inverse modulation scheme employed at the base station (i.e., QPSK, 8-PSK, 16-QAM, or any other modulation scheme known). A decoder 422 may be used to provide various signal processing functions on the demodulated voice frames such as de-scrambling using the long PN code, de-interleaving, decoding, and performing a CRC check function on the decoded voice frames. A vocoder 424 may be used to convert the voice frames into PCM voice using a decompression algorithm compatible with the vocoder in the BSC 108.

The despreading function may be performed by despreading the baseband signal with the assigned Walsh code for the dedicated forward link traffic channel. The subscriber station 104 may be configured to perform blind rate and code detection to determine whether a supplemental forward link traffic channel is being used to carry a portion of the voice information. Blind rate and code detection may be performed in the demodulator 420 by despreading the baseband signal in each frame with the different Walsh codes allocated to the subscriber station 104 to support overflow. For each of these Walsh codes, the despread baseband signal may be provided to the decoder 422. If the CRC check function is valid for the baseband signal, this means two things. First, overflow has been sent on one of the supplemental forward link traffic channels allocated to the subscriber station 104. Second, the overflow was intended for that subscriber station 104 because a valid CRC check function means that the baseband signal was successfully unscrambled in the decoder 422 by the long PN code. The overflow may then be combined with the data carried on the dedicated forward link traffic channel and provided to the vocoder 424. If, on the other hand, a valid CRC check function cannot be detected after sequencing through each of the Walsh codes allocated to the subscriber station 104 to handle overflow, then just the data carried on the dedicated forward link traffic channel may be provided to the vocoder 424.

The location of the processor 406 is dependent on whether the management of the Walsh code space is part of a centralized or distributed system. By way of example, a distributed system may utilize a processor 406 in every base station. In this configuration, the processor 406 for each base station determines the Walsh code assignments for the subscribers station within its cellular region. Conversely, a centralized system may utilize a single processor 406 in the BSC 108 to coordinate the Walsh code assignments for multiple base stations. A centralized approach may provide some advantages during soft handoff where a subscriber station is communication with multiple base stations simultaneously. As a practical matter, the processor 406 will generally be physically located in close proximity to the vocoder to reduce the interface complexity between the two. However, the processor 406 may be located anywhere in the access network. For the purposes of clarity, the processor 406 will reside in a communications station with the understanding that the communications station may be a base station, a BSC, or any other structure within the access network that houses the processor 406.

The processor 406 may be embodied in software capable of being executed on a general purpose processor, a specific application processor, or in any other software execution environment. In these embodiments, any reference to the term processor shall be understood to means either the software alone, or the software in combination with the general purpose processor, specific application processor, or the software execution environment. The software may reside in RAM memory, flash memory, ROM memory, EPROM memory, EEPROM memory, registers, hard disk, removable disk, CD-ROM, or any other storage medium known in the art. Alternatively, the processor may be in implemented in hardware or in any combination of hardware and software. By way of example, the processor may be implemented with an application specific integrated circuit (ASIC), field programmable gate array (FPGA) or other programmable logic device, discrete gate or transistor logic, discrete hardware components, any combination thereof, or any other equivalent or non-equivalent structure designed to perform one or more of the functions disclosed herein. It is to be understood that the any reference to the term processor for managing Walsh code assignments may embrace all possible implementations disclosed herein as well as other embodiments that would be apparent to those skilled in the art.

In at least one embodiment of the processor, the subscriber stations operating within the base station's cellular region may be divided into several groups or pools, with each pool having a different set of the Walsh codes to handle overflow. The number of Walsh codes assigned to each pool may be less than the number of subscriber stations assigned to each pool. This approach is based on a statistical determination that it is highly unlikely that every subscriber station in the pool will be transmitting at full rate simultaneously. The actual number of Walsh codes that is assigned to each pool is generally based on a tradeoff between increased efficiency in managing the Walsh code space and the probability of Walsh code outage. Walsh code outage is defined as an event where there is at least one subscriber station that cannot be served with the minimum voice rate requested. To maintain a low Walsh code outage, a margin should be applied above the average voice rate when determining the total number of Walsh codes to be assigned to a pool. This approach works better for larger pools with more subscriber stations because of the lower margin required by the reduced statistical variance. This actually works to the advantage of the skilled artisan designing a Walsh code management system because as more subscriber stations communicate with the base station, the more desirable it is to achieve better Walsh code space management.

To achieve efficient Walsh code space management, the processor should support a pool of subscriber stations with a small number of Walsh codes allocated to each subscriber station to handle overflow, and achieve a low probability of Walsh code outage. This may be achieved through a mapping function that may be derived through simulations or by empirical or mathematical analysis. An example of a mapping function using a matrix operation will be described. In particular, a mapping function may be used to create an assignment matrix to allocate the Walsh codes to each subscriber station in the pool to handle overflow. The frame-by-frame Walsh code assignment for each subscriber station in the pool that needs a supplemental forward link traffic channel may be made from various permutations of the assignment matrix.

To illustrate this mapping function, a pool having n subscriber stations will be used. The variable k, where $k \leq n$, will be used to denote the total number of Walsh codes assigned to the pool, or the total number of subscriber stations that may receive full rate voice frames simultaneously. As explained above, k may be determined by adding a margin to the number of Walsh codes needed to support the average voice rate of the n subscriber stations. The variable l will be used to denote the number of Walsh codes allocated to each subscriber station in the pool, or the number Walsh codes available to each subscriber station from the pool to assign a supplemental forward link traffic channel. The number of Walsh codes allocated to each subscriber station, l, is optimal if it is as low as possible for a given n and k. The lowest value of l satisfies the following equation:

$$l > k(n-k)/n \qquad (1)$$

All n subscriber stations will be numbered by $1, \ldots, n$. All k available Walsh codes from the pool will be numbered by $1, \ldots, k$. The Walsh codes allocated to each subscriber station will be denoted by $b_{ij} \in \{1, \ldots, k\}, i=1, \ldots, n, j=1, \ldots, l$. An assignment matrix may be constructed $[b_{ij}], i=1, \ldots, n, j=1, \ldots, l$ that may be used to allocate l Walsh codes to each subscriber station. An example of an assignment matrix $[b_{ij}]$ is shown below with n=6, k=4, and l=2 (note, that the n, k, and l values satisfy equation (1)):

$$[b_{ij}] = \begin{bmatrix} 1 & 2 \\ 2 & 3 \\ 1 & 3 \\ 1 & 4 \\ 2 & 4 \\ 3 & 4 \end{bmatrix} \qquad (2)$$

In the above example, the processor allocates Walsh codes 1 and 2 to subscriber station 1, Walsh codes 2 and 3 to subscriber station 2, Walsh codes 1 and 3 to subscriber station 3, and so on. The assignment matrix $[b_{ij}]$ has the following property: For each subset of k subscriber stations $i_1, \ldots, i_k$ out of their set $\{1, \ldots, n\}$, there exist $j_1, \ldots, j_k$ such that all $b_{i_1 j_1}, \ldots, b_{i_k j_k}$ are different. An assignment matrix with this property is said to have an assignment property, and may be used to assign a different Walsh code to support a supplemental forward link traffic channel to any k number of subscriber stations and simultaneously transmit full rate voice frames to each of those subscriber stations.

An assignment matrix with an assignment property may be constructed in a number of fashions, for example, by trial and error. Alternatively, a systematic approach may be used. To best illustrate one systematic approach, the assignment matrix $[b_{ij}]$ will be represented as a binary assignment matrix M=M(n,k,l). The Walsh codes allocated to each subscriber station are determined by a binary row of length k with l number of "1"s and k-l number of "0"s. The row corresponding to the subscriber station i is the row i of an n×k matrix denoted by M. If on position j, j=1, ..., k, the row i of the assignment matrix M has a "1", this means that the code j is one of the Walsh codes allocated to the subscriber station i and available for assignment to support a supplemental forward link traffic channel. By way of example, if the Walsh codes 1, 3, and 5 are allocated to the subscriber station i=1, and k=5, then in the assignment matrix, row 1 of M is [1 0 1 0 1]. The binary assignment matrix M(n,k,l) for the non-binary assignment matrix $[b_{ij}]$ (2) is $$M(n, k, l) = \begin{bmatrix} 1100 \\ 0110 \\ 1010 \\ 1001 \\ 0101 \\ 0011 \end{bmatrix} \quad (3)$$

The assignment matrix with the assignment property M may be created using either a first or second construction. The first construction of the assignment matrix M will be described before the second construction with the understanding that the second construction is used to create the assignment matrix given by (3).

An assignment matrix M having the first construction may be created by distributing "1"s starting in the left-most column of row 1 and moving from left to right for l number of consecutive columns. Next, k-l number of "0"s may be distributed in row 1 starting with the column to the immediate right of the last "1" and moving from left to right in consecutive columns to the end of the row. The assignment matrix for row 1 of M becomes [1 ... 1 0 ... 0]. The second row of the matrix M may be derived by a right horizontal shift of the row immediately above it by one position. The assignment matrix for row 2 of M becomes [0 1 ... 1 0 ... 0], and so on up to the row k−l+1 that becomes [0 ... 0 1 ... 1]. After the row k−l+1, the last "1" goes to the left-most column of the next row giving a cyclic shift. Thus the row k−l becomes [1 0 ... 0 1 ... 1] and so on. This process continues until all n rows of the matrix M are complete. The constructed binary matrix M has the assignment property for k=n/2, l=(k+1)/2, n=6+4i, i∈{0, 1, ...}.

The second construction of the assignment matrix M has k=(n/2)+1, l=k/2, n=6+4i, i∈{0, 1, ...} (note that k is even), and may be created as follows. The upper left (k−1)×(k−1) submatrix of M is such that its row j constitutes a horizontal cyclic shift to the right (j−1) positions of the row [1 ... 1 0 ... 0] which has l=k/2 number of "1"s and k−l−1 number of "0"s. The last column of the upper (k−1)×k submatrix of M includes all "0"s. The lower left (k−1)×(k−1) submatrix of M is such that its row j constitutes a horizontal cyclic shift to the right (j−1) positions of the row [1 ... 1 0 ... 0] which has l−1 number of "1"s and k−l number of "0"s. The last column of the lower (k−1)×k submatrix of M includes all "1"s. This construction of M is called the second construction. The assignment matrix M (3) is an example of the second construction.

Once an assignment matrix is constructed for a pool of subscriber stations, and the various/Walsh codes are allocated to each of the n subscriber stations in the pool, the Walsh code assignments may then be made to each subscriber station requiring a full rate frame. This may be achieved by constructing a binary k×k matrix denoted by K composed by k rows of the n×k matrix M(n,k,l). If an assignment matrix M(n,k,l) has the assignment property then for any k rows of M(n,k,l), which compose K, there is a permutation of rows K giving a binary k×k matrix G with all "1"s in the main diagonal.

The construction of the K matrix depends on the resource demands of the subscriber stations. By way of example, if subscriber stations i, i=2, 3, 4, 5, each require a full rate voice frame, then the K matrix constructed from the assignment matrix M (n,k,l) given by (3) is $$K = \begin{bmatrix} 0110 & \text{Subscriber station 2} \\ 1010 & \text{Subscriber station 3} \\ 1001 & \text{Subscriber station 4} \\ 0101 & \text{Subscriber station 5} \end{bmatrix} \quad (4)$$

Next, a permutation of the K matrix (4) may be found that results in G matrix having all "1"s in the main diagonal as shown below:

$$K = \begin{bmatrix} 0110 & \text{Subscriber station 2} \\ 1010 & \text{Subscriber station 3} \\ 1001 & \text{Subscriber station 4} \\ 0101 & \text{Subscriber station 5} \end{bmatrix} \rightarrow \quad (5)$$

$$G = \begin{bmatrix} 1001 & \text{Subscriber station 4} \\ 0110 & \text{Subscriber station 2} \\ 1010 & \text{Subscriber station 3} \\ 0101 & \text{Subscriber station 5} \end{bmatrix}$$

Once the G matrix is constructed, the Walsh code assignments may be made. In the above example, subscriber station 4 may be assigned Walsh code 1, subscriber station 2 may be assigned Walsh code 2, subscriber station 3 may be assigned Walsh code 3, and subscriber station 5 may be assigned Walsh code 4.

The manner in which the G matrix is derived from the K matrix may be simplified for the matrices M of the first and second constructions. More specifically, for any k chosen rows of M that give the binary k×k matrix K, a vertical cyclic shift of K results in a k×k matrix that has all "1"s in the main diagonal. For the purposes of illustration, an assignment matrix M will be used with 22 subscriber stations in the pool, n=22, and 11 Walsh codes assigned to that pool, k=11. From equation (1), the number of Walsh codes that should be allocated to each subscriber station in the pool cannot be less than 6 and in the illustrative assignment matrix, l=6. A binary n×k assignment matrix M of the first construction may be given by:

$$M = \begin{bmatrix} 1 & 1 & 1 & 1 & 1 & 1 & 0 & 0 & 0 & 0 & 0 \\ 0 & 1 & 1 & 1 & 1 & 1 & 1 & 0 & 0 & 0 & 0 \\ 0 & 0 & 1 & 1 & 1 & 1 & 1 & 1 & 0 & 0 & 0 \\ 0 & 0 & 0 & 1 & 1 & 1 & 1 & 1 & 1 & 0 & 0 \\ 0 & 0 & 0 & 0 & 1 & 1 & 1 & 1 & 1 & 1 & 0 \\ 0 & 0 & 0 & 0 & 0 & 1 & 1 & 1 & 1 & 1 & 1 \\ 1 & 0 & 0 & 0 & 0 & 0 & 1 & 1 & 1 & 1 & 1 \\ 1 & 1 & 0 & 0 & 0 & 0 & 0 & 1 & 1 & 1 & 1 \\ 1 & 1 & 1 & 0 & 0 & 0 & 0 & 0 & 1 & 1 & 1 \\ 1 & 1 & 1 & 1 & 0 & 0 & 0 & 0 & 0 & 1 & 1 \\ 1 & 1 & 1 & 1 & 1 & 0 & 0 & 0 & 0 & 0 & 1 \\ 1 & 1 & 1 & 1 & 1 & 1 & 0 & 0 & 0 & 0 & 0 \\ 0 & 1 & 1 & 1 & 1 & 1 & 1 & 0 & 0 & 0 & 0 \\ 0 & 0 & 1 & 1 & 1 & 1 & 1 & 1 & 0 & 0 & 0 \\ 0 & 0 & 0 & 1 & 1 & 1 & 1 & 1 & 1 & 0 & 0 \\ 0 & 0 & 0 & 0 & 1 & 1 & 1 & 1 & 1 & 1 & 0 \\ 0 & 0 & 0 & 0 & 0 & 1 & 1 & 1 & 1 & 1 & 1 \\ 1 & 0 & 0 & 0 & 0 & 0 & 1 & 1 & 1 & 1 & 1 \\ 1 & 1 & 0 & 0 & 0 & 0 & 0 & 1 & 1 & 1 & 1 \\ 1 & 1 & 1 & 0 & 0 & 0 & 0 & 0 & 1 & 1 & 1 \\ 1 & 1 & 1 & 1 & 0 & 0 & 0 & 0 & 0 & 1 & 1 \\ 1 & 1 & 1 & 1 & 1 & 0 & 0 & 0 & 0 & 0 & 1 \end{bmatrix} \quad (6)$$

Next, a k×k matrix K may be constructed for any k rows of the assignment matrix M (6). An example of a k×k matrix K is shown below.

$$K = \begin{bmatrix} 0 & 1 & 1 & 1 & 1 & 1 & 1 & 0 & 0 & 0 & 0 & \text{row 13 of } M \\ 0 & 0 & 1 & 1 & 1 & 1 & 1 & 1 & 0 & 0 & 0 & \text{row 3 of } M \\ 0 & 0 & 1 & 1 & 1 & 1 & 1 & 1 & 0 & 0 & 0 & \text{row 14 of } M \\ 0 & 0 & 0 & 1 & 1 & 1 & 1 & 1 & 1 & 0 & 0 & \text{row 4 of } M \\ 0 & 0 & 0 & 1 & 1 & 1 & 1 & 1 & 1 & 0 & 0 & \text{row 15 of } M \\ 0 & 0 & 0 & 0 & 1 & 1 & 1 & 1 & 1 & 1 & 0 & \text{row 16 of } M \\ 0 & 0 & 0 & 0 & 0 & 1 & 1 & 1 & 1 & 1 & 1 & \text{row 6 of } M \\ 1 & 1 & 0 & 0 & 0 & 0 & 0 & 1 & 1 & 1 & 1 & \text{row 8 of } M \\ 1 & 1 & 1 & 0 & 0 & 0 & 0 & 0 & 1 & 1 & 1 & \text{row 9 of } M \\ 1 & 1 & 1 & 0 & 0 & 0 & 0 & 0 & 1 & 1 & 1 & \text{row 20 of } M \\ 1 & 1 & 1 & 1 & 1 & 0 & 0 & 0 & 0 & 0 & 1 & \text{row 11 of } M \end{bmatrix} \quad (7)$$

The order of rows in K is almost the same as in M. If any two identical rows of M participate in K, they follow each other.

In the above example of the K matrix given by (7), subscriber stations i, for example, i=3,4,6,8,9,11,13,14,15,16,20, each require a supplemental channel to support a full rate voice frame. The Walsh code assignments may be generated by vertically shifting the K matrix given by (7) by four rows to obtain the following G matrix.

$$G = \begin{bmatrix} 1 & 1 & 0 & 0 & 0 & 0 & 0 & 1 & 1 & 1 & 1 & \text{row 8 of } M \\ 1 & 1 & 1 & 0 & 0 & 0 & 0 & 0 & 1 & 1 & 1 & \text{row 9 of } M \\ 1 & 1 & 1 & 0 & 0 & 0 & 0 & 0 & 1 & 1 & 1 & \text{row 20 of } M \\ 1 & 1 & 1 & 1 & 1 & 0 & 0 & 0 & 0 & 0 & 1 & \text{row 11 of } M \\ 0 & 1 & 1 & 1 & 1 & 1 & 1 & 0 & 0 & 0 & 0 & \text{row 13 of } M \\ 0 & 0 & 1 & 1 & 1 & 1 & 1 & 1 & 0 & 0 & 0 & \text{row 3 of } M \\ 0 & 0 & 1 & 1 & 1 & 1 & 1 & 1 & 0 & 0 & 0 & \text{row 14 of } M \\ 0 & 0 & 0 & 1 & 1 & 1 & 1 & 1 & 1 & 0 & 0 & \text{row 4 of } M \\ 0 & 0 & 0 & 1 & 1 & 1 & 1 & 1 & 1 & 0 & 0 & \text{row 15 of } M \\ 0 & 0 & 0 & 0 & 1 & 1 & 1 & 1 & 1 & 1 & 0 & \text{row 16 of } M \\ 0 & 0 & 0 & 0 & 0 & 1 & 1 & 1 & 1 & 1 & 1 & \text{row 6 of } M \end{bmatrix} \quad (8)$$

Once the G matrix is constructed, the Walsh code assignments may be made. In the above example, subscriber station 8 may be assigned Walsh code 1, subscriber station 9 may be assigned Walsh code 2, subscriber station 20 may be assigned Walsh code 3, subscriber station 11 may be assigned Walsh code 4, subscriber station 13 may be assigned Walsh code 5, and so on.

The first and second constructions give the matrices M with the assignment property that are optimal in sense that they have the minimal l for a given n and k. If any w rows of any matrix M(n,k,l) of the first or second construction are removed, the resulting matrix M'(n−w,k,l) continues to have the assignment property. This means that the removal of the rows results in a matrix with the assignment property for any n≧k, and not just for n=6+4i, i∈{0, 1, . . . } as above. The matrices M'(n−1,k,l) are optimal in sense that they have the minimal l for a given n in the first construction and for any given n>11 in the second construction.

Figure 5:
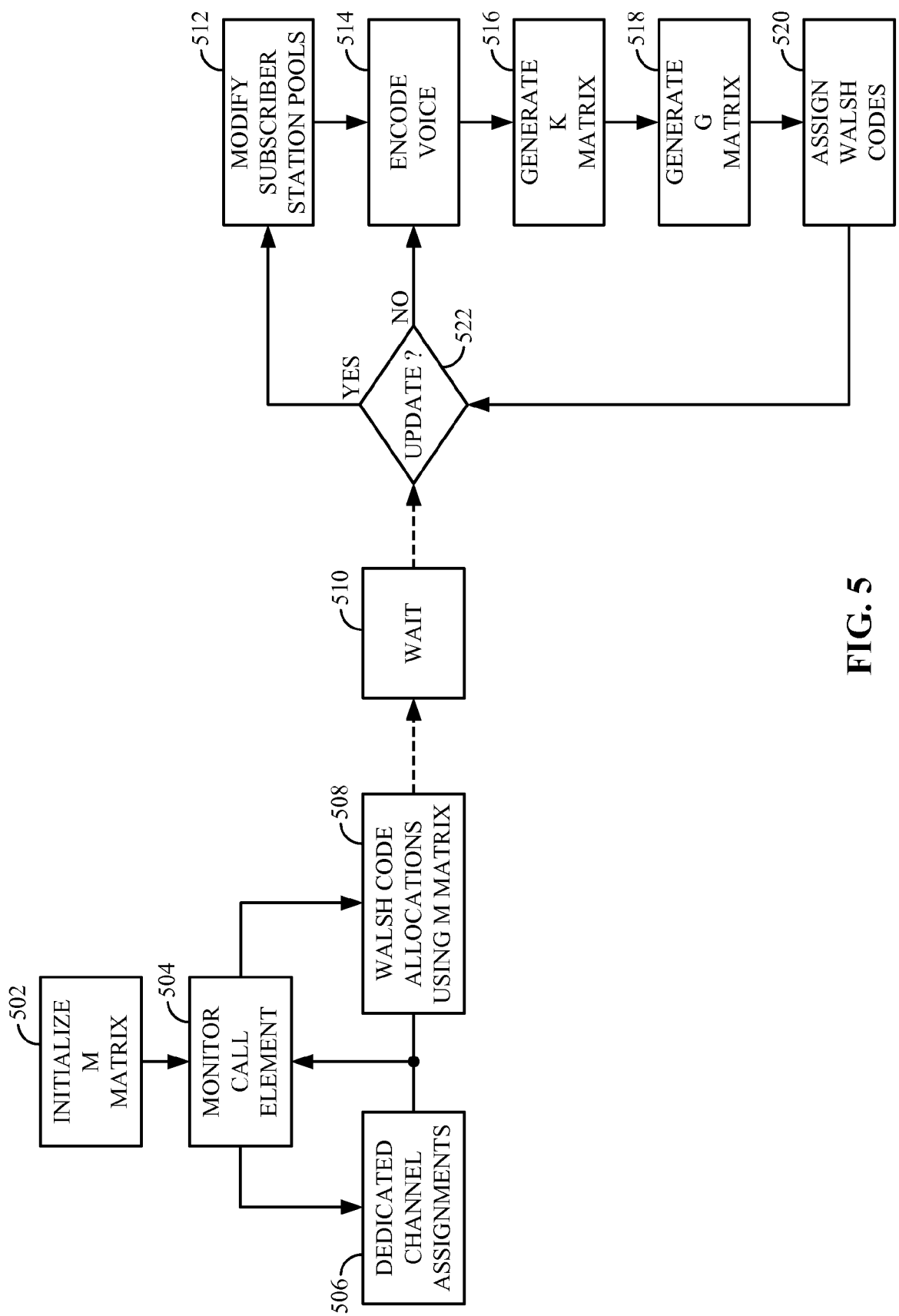
FIG. 5 is a flow diagram illustrating an embodiment of a processor used to assign Walsh codes in a CDMA communications system.

FIG. 5 is a flow diagram that illustrates the operation for at least one embodiment of the processor. In step 502, the assignment matrix M may be initialized. This may entail nothing more than retrieving a preprogrammed assignment matrix M from memory, or alternatively, may involve the creation of the assignment matrix M using the procedures outlined above. The processor may use a single or multiple assignment matrices M to support the subscriber station pools. The assignment matrix M may be static to conserve processing resources, or alternatively may be dynamically adjusted to accommodate varying operating conditions. By way of example, if the processor is experiencing a high percentage of Walsh outages, the assignment matrix M could be regenerated with more Walsh codes assigned to each pool. If, on the other hand, the occurrences of Walsh outages are virtually non-existent, the processor may reconstruct a more aggressive assignment matrix M with less Walsh codes assigned to each pool. In any event, once the assignment matrix M is initialized, the processor is ready to support communications with subscriber stations in the base station's cellular region.

In step 504, the processor may be configured to monitor the active calls between the base station and the various subscriber stations. The call element may be used to signal the processor when new calls are established and existing calls are terminated in the base station's cellular region. If a new call is established, a dedicated Walsh code may be assigned in step 506 to support a forward link traffic channel. The processor may also use the assignment matrix M to allocate a number of Walsh codes to the new call in step 508 to support a supplemental forward link traffic channel. If an existing call is terminated, then its dedicated Walsh code may be released in step 506, and its allocated Walsh codes from the assignment matrix M may also be released in step 508. In any event, the processor continues to monitor the call element in step 504 as the processor dynamically assigns and allocates Walsh codes.

The subscriber station pools may be modified by the new Walsh code allocations and de-allocations as they occur. Alternatively, the subscriber stations pools may be modified periodically by holding the new Walsh code allocations and de-allocations in step 510 until a periodic update command is received. The latter approach is illustrated in FIG. 5. In this configuration, the subscriber station pools are modified periodically in step 512, yet the Walsh code assignments for the supplemental forward link traffic channels may be made on a frame-by-frame basis.

In step 514, the communications for the active calls may be encoded using a vocoder or similar device. The full rate frame requirements may then be reported back to the processor. In response to the full rate frame requirements, the processor may construct a K matrix for each subscriber station pool in step 516. The K matrix for each subscriber station pool may then be manipulated in step 518 to generate the G matrices. In step 520, the G matrices may used by the processor to assign a Walsh code to each subscriber station with a full rate frame requirement to support a supplemental forward link traffic channel. Once the Walsh code assignments are completed, a decision may be made in step 522 as to whether the subscriber station pool Walsh code allocations and de-allocations should be modified to reflect the new and recently terminated calls before the next frame is encoded.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in anywhere in the access network. In the alternative, the processor and the storage medium may reside as discrete components anywhere in the access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communications station, comprising:
memory having an assignment matrix having n rows, k columns, l number of ones in each of the rows, and k–l number of zeros in each of the rows, where n=a number of subscriber stations assigned to a group, k equals a number of orthogonal codes assigned to the group, and l=a number of the orthogonal codes allocated to each of the n subscriber stations from the k number of orthogonal codes assigned to the group;
means for constructing a second matrix having k rows selected from the assignment matrix; each of the k rows corresponding to one of k subscriber stations selected from the n subscriber stations;
means for permuting the rows of the second matrix such that a diagonal extending from the first column to the kth column comprises all ones; and
means for assigning one of the k orthogonal codes to each of the k subscriber stations as a function of the permuted second matrix.

2. The communications station of claim 1 wherein l is the lowest integer that satisfies the following equation:

$$l > k(n-k)/n.$$

3. The communications station of claim 1 wherein the means for permuting the rows of the second matrix comprises means for cyclically shifting the rows of the second matrix vertically until the diagonal extending from the first column to the kth column comprises all ones.

4. The communications station of claim 1 wherein k=n/2, l=(k+1)/2, and n=6+4i, where i is any non-negative integer.

5. The communications station of claim 1 wherein k=(n/2)+1, l=k/2, and n=6+4i, where i is any non-negative integer.

6. The communications station of claim 1 wherein k=n/2, l=(k+1)/2, and n=5+4i, where i is any non-negative integer.

7. The communications station of claim 1 wherein k=(n/2)+1, l=k/2, and n=5+4i, where i is any integer greater than 1.

8. The communications station of claim 1 wherein the assignment matrix includes all ones in the first l columns of the first row and all zeros in the remaining columns of the first row, and wherein each of the remaining rows of the assignment matrix are cyclically shifted horizontally by one bit from the row immediately above it.

9. The communications station of claim 1 wherein the assignment matrix comprises a submatrix comprising the first k–1 columns, the submatrix comprising all ones in the first l columns of the first row and all zeros in the remaining columns of the first row, and wherein each of the remaining rows of the submatrix are cyclically shifted horizontally by one bit from the row immediately above it, and wherein the kth column includes all zeros in the upper n/2 rows and all ones in the lower n/2 rows.

10. The communications station of claim 1 further comprising means for constructing an intermediate matrix including all ones in the first l columns of the first row and all zeros in the remaining columns of the first row, and wherein each of the remaining rows of the intermediate matrix are cyclically shifted horizontally by one bit from the row immediately above it, and wherein the assignment matrix comprises n rows from the intermediate matrix, where n is less than or equal to the number of rows in the intermediate matrix and n≧k.

11. The communications station of claim 1 further comprising means for constructing an intermediate matrix having a number of rows and k columns, the intermediate matrix including a submatrix comprising the first k−1 columns, the submatrix comprising all ones in the first l columns of the first row and all zeros in the remaining columns of the first row, and wherein each of the remaining rows of the submatrix are cyclically shifted horizontally by one bit from the row immediately above it, and wherein the kth column of the intermediate matrix includes all zeros in the upper half of the rows and all ones in the bottom half of the rows, and wherein the assignment matrix comprises n rows from the intermediate matrix, where n is less than or equal to the number of rows in the intermediate matrix and $n \geq k$.

* * * * *